(12) United States Patent
Jansen

(10) Patent No.: US 10,259,282 B2
(45) Date of Patent: Apr. 16, 2019

(54) LINK ASSEMBLY

(71) Applicant: SAF-HOLLAND GmbH, Bessenbach (DE)

(72) Inventor: Roger Jansen, Holton, MI (US)

(73) Assignee: SAF-HOLLAND GmbH, Bessenbach (DE)

( * ) Notice: Subject to any disclaimer, the term of this patent is extended or adjusted under 35 U.S.C. 154(b) by 14 days.

(21) Appl. No.: 15/510,115

(22) PCT Filed: Sep. 8, 2015

(86) PCT No.: PCT/EP2015/070443
§ 371 (c)(1),
(2) Date: Mar. 9, 2017

(87) PCT Pub. No.: WO2016/038004
PCT Pub. Date: Mar. 17, 2016

(65) Prior Publication Data
US 2017/0259635 A1     Sep. 14, 2017

(30) Foreign Application Priority Data
Sep. 12, 2014   (DE) .................. 10 2014 218 321

(51) Int. Cl.
*B60G 9/00* (2006.01)
*B60G 7/00* (2006.01)
*B60G 7/02* (2006.01)

(52) U.S. Cl.
CPC .............. *B60G 7/001* (2013.01); *B60G 7/02* (2013.01); *B60G 9/003* (2013.01); *B60G 2200/31* (2013.01); *B60G 2204/143* (2013.01); *B60G 2204/148* (2013.01); *B60G 2204/4302* (2013.01); *B60G 2206/10* (2013.01); *B60G 2206/8101* (2013.01); *B60G 2206/8201* (2013.01)

(58) Field of Classification Search
CPC .......... B60G 5/06; B60G 7/001; B60G 9/003; B60G 2204/4306; B60G 2200/31; B60G 2204/143
USPC ......................... 280/124.11, 124.16, 124.128
See application file for complete search history.

(56) References Cited

U.S. PATENT DOCUMENTS

| 5,690,353 A | 11/1997 | Vandenberg |
| 6,843,490 B2 * | 1/2005 | Raidel, II .................. B60G 7/02 280/124.116 |

(Continued)

FOREIGN PATENT DOCUMENTS

| DE | 29824897 | 5/2003 |
| DE | 102005038274 | 2/2007 |

(Continued)

OTHER PUBLICATIONS

European Patent Office; International Search Report, dated Nov. 11, 2015.

*Primary Examiner* — Toan C To
(74) *Attorney, Agent, or Firm* — Price Heneveld LLP

(57) ABSTRACT

A link assembly for a vehicle, comprising a longitudinal link which has an upper link element and a lower link element, and at least one bushing receptacle for receiving a bearing bushing, wherein the bushing receptacle is at least partially integrated in at least one of the link elements, or is connectable as a separate part to the upper link element and the lower link element.

15 Claims, 3 Drawing Sheets

(56) References Cited

U.S. PATENT DOCUMENTS

| | | | | |
|---|---|---|---|---|
| 7,484,744 B2* | 2/2009 | Galazin | ............... | B60G 9/003 280/124.116 |
| 7,726,673 B2* | 6/2010 | Saieg | ............... | B60G 7/001 280/124.116 |
| 8,292,313 B2* | 10/2012 | Pierce | ............... | B60G 9/003 280/124.11 |
| 8,333,396 B2* | 12/2012 | Saieg | ............... | B60G 9/003 280/124.116 |
| 8,678,407 B2* | 3/2014 | Eveley | ............... | B60G 7/001 280/124.11 |
| 8,764,038 B2* | 7/2014 | Piehl | ............... | B60G 11/27 280/124.116 |
| 8,998,229 B2* | 4/2015 | Michel | ............... | B60G 5/06 280/124.116 |
| 2001/0020775 A1* | 9/2001 | Pierce | ............... | B60G 7/001 280/124.128 |
| 2002/0135151 A1* | 9/2002 | Schlosser | ............... | B60G 7/001 280/124.128 |
| 2004/0080132 A1* | 4/2004 | Chan | ............... | B60G 7/001 280/124.11 |
| 2006/0237940 A1* | 10/2006 | Raidel | ............... | B60G 9/003 280/124.116 |
| 2008/0224435 A1* | 9/2008 | Holt | ............... | B60G 7/001 280/124.11 |

FOREIGN PATENT DOCUMENTS

| | | |
|---|---|---|
| DE | 102009051159 | 5/2011 |
| EP | 1479930 | 11/2004 |
| GB | 2396140 | 6/2004 |
| WO | 0001548 | 1/2000 |
| WO | 03064192 | 8/2003 |

* cited by examiner

LINK ASSEMBLY

BACKGROUND OF THE INVENTION

The invention relates to a link assembly for a vehicle, in particular for a commercial vehicle.

A link assembly serves for suspension of a vehicle axle on the vehicle frame, wherein the vehicle axle in the case of commercial vehicles is customarily a rigid axle. The use of longitudinal links which substantially extend in the longitudinal direction of the vehicle and are mounted about a pivot axis running transversely with respect to the vehicle axle is known. A first end of the longitudinal link is arranged pivotably here on the vehicle frame, in particular on a bearing bracket. A second end of the longitudinal link receives the vehicle axle. The vehicle axle can be mounted on the frame of the vehicle in a sprung or damped manner by means of additional spring elements and/or damping elements.

A link assembly for mounting a vehicle axle on a vehicle frame is described in U.S. Pat. No. 5,690,353 A. The link assembly here comprises a longitudinal link of two-part design. The two-part longitudinal link is mounted on a bearing bolt of the vehicle frame via a specially shaped bearing bushing. The invention is based on the object of providing a link assembly which is of particularly stable construction and can be mounted as simply as possible.

SUMMARY OF THE INVENTION

The link assembly comprises a longitudinal link that has an upper link element (link upper part) and a lower link element (link lower part). The link assembly furthermore comprises at least one bushing receptacle for receiving a bearing bushing. The bushing receptacle is at least partially integrated in at least one of the link elements (in the link upper part and/or in the link lower part). Alternatively, the bushing receptacle is connectable as a separate part to the upper link element and to the lower link element (to the link upper part and to the link lower part). The invention is based on a multi-part, in particular two-part longitudinal link which has an upper link element and a lower link element which, connected to each other, form the longitudinal link. It is preferred here for both the upper link element and the lower link element to have a recess for a vehicle axle, and therefore the vehicle axle can be arranged between the upper link element and the lower link element. By this means, the vehicle axle does not need to be pushed in a complicated manner into a corresponding bore of the longitudinal link, and therefore the installation is considerably simplified in comparison to a single-part longitudinal link. The upper link element and the lower link element are fixedly connected to each other to form the longitudinal link. For this purpose, an integrally bonded connection is preferably provided, in particular in the region of the vehicle axle or in the region of the respective recesses in the link elements. Alternatively or additionally, there can also be a form-fitting and/or force-fitting connection. The vehicle axle is secured, preferably in an integrally bonded manner, on the link upper part and on the link lower part. A particularly preferred embodiment of an integrally bonded connection is a welded connection. The longitudinal link is secured on the vehicle or on the vehicle frame (bearing bracket) via a bearing bushing, for example a rubber ring, which receives a bearing journal. For this purpose, the longitudinal link has a bushing receptacle for receiving the bearing bushing. The bushing receptacle defines or surrounds an in particular cylindrical opening into which the bearing bushing is preferably pressed. The bushing receptacle is expediently closed circumferentially, i.e. is designed, for example, as a closed ring.

According to a preferred embodiment of the invention, the bushing receptacle is integrated in one of the link elements, i.e. the link upper part or the link lower part. This should be understood as meaning in particular that at least part of the bushing receptacle forms an integral part of the corresponding link element. The bushing receptacle is therefore not a separate part secured to the link element, but rather is formed integrally with the link element. The corresponding link element has a recess or opening for receiving the bearing bushing or into which the bearing bushing is pressed. The bushing receptacle is therefore formed by corresponding shaping of the link element. The bushing receptacle can also be referred to as a pivot tube or can form a pivot tube.

The link element is preferably a cast part. The bushing receptacle is preferably a region of the cast part but can be machined, optionally retrospectively. The bushing receptacle formed by forming a recess or opening in the link element is particularly stable and ensures reliable storage of the link assembly on the vehicle frame. In addition, the installation is particularly simple because of the two-part design of the link assembly.

According to an alternatively preferred embodiment of the invention, the bushing receptacle is a separate, in particular annular part which is fastenable to fastening surfaces, which are provided for this purpose, of the link elements. In particular, an integrally bonded connection is provided between the link element (for example cast part) and the bushing receptacle. The link elements expediently each have a curved contact or connecting surface for bearing against a correspondingly curved outer surface of the annular bushing receptacle. The contact or connecting surface and the outer surface are preferably connected in a flat manner to each other. The flat connection between link element and bushing receptacle is particularly stable in comparison to a merely spot-type or linear connection. The contact surfaces of the link elements are preferably of circular-arc-shape design in cross section for interaction with the in particular cylindrical casing surface of the bushing receptacle.

In a preferred embodiment of the invention, it is provided that the bushing receptacle is completely integrated in one of the link elements. It should be understood by this that the bushing receptacle is designed in such a manner that a bearing bushing which is accommodated therein exclusively contacts the upper link element or the lower link element. The corresponding link element in particular has a circumferentially closed opening for the bearing bushing. The in particular cylindrical opening is preferably surrounded by the cast material of the link element formed as a cast part. The opening is preferably bounded at the end of the link element by a curved wall. The curved wall preferably forms a circular-arc-shaped portion of a hollow cylinder.

According to an embodiment of the invention, it is provided that the bushing receptacle is integrated in the upper link element and is connectable to the lower link element or, in the mounted state, is connected to the lower link element. The integration in the link element facing the vehicle achieves particularly good stability. The two link elements are connected to each other in the region of the bushing receptacle.

It is preferably provided that the bushing receptacle has a curved, in particular cylindrical, outer surface or outer wall, and that the lower link element has a correspondingly curved abutment or connecting surface for placing against the curved outer surface or outer wall or for connecting to the curved outer surface or outer wall of the bushing receptacle. The outer wall has in particular a cylindrical outer surface. The abutment or connecting surface for connecting to the outer surface of the bushing receptacle preferably has a curved or circular-arc-shaped cross section. An integrally bonded connection is preferably provided.

According to a further embodiment of the invention, the bushing receptacle is integrated in the lower link element and is connectable to the upper link element or, in the mounted state, is connected to the upper link element.

It is preferably provided that the bushing receptacle has a curved, in particular cylindrical, outer surface or outer wall, and that the upper link element has a correspondingly curved abutment or connecting surface for placing against the curved outer surface or outer wall or for connecting to the curved outer surface or outer wall of the bushing receptacle. The outer wall has in particular a cylindrical outer surface. The abutment or connecting surface for connecting to the outer surface of the bushing receptacle preferably has a curved or circular-arc-shaped cross section. An integrally bonded connection is preferably provided.

In a further preferred embodiment, the bushing receptacle is of multi-part design and has an upper shell and a lower shell. The upper shell of the in particular two-part bushing receptacle can be arranged, in particular fastened, for example, to the upper link element and the lower shell to the lower link element. Upper shell and lower shell preferably form a closed bushing receptacle when joined together, i.e. an in particular cylindrical opening with a closed casing surface.

It is preferred that the upper shell of the bushing receptacle is integrated in the upper link element and the lower shell of the bushing receptacle is integrated in the lower link element. The upper link element therefore preferably has an upper shell which is formed integrally or as a single part therewith, and the lower link element has a corresponding lower shell. In other words, the upper link element has a first recess which is preferably partially circular or semicircular in cross section, and the lower link element has a second recess completing the circle. The recesses forming the bushing receptacle in the upper and lower link element are preferably formed directly in the cast material of the link element.

In a further preferred embodiment of the invention, it is provided that the link elements surround an inner clearance in a curved manner and are connectable to each other in the region of the bushing receptacle via the bushing receptacle. The link elements are preferably connectable to each other directly, in particular in an integrally bonded manner (or are connected in the joined-together state) in the region of the vehicle axle and are connectable indirectly, via the bushing receptacle (or are connected in the joined-together state) in the region of the bushing receptacle. For this purpose, the link elements are each connectable, in particular in an integrally bonded manner, to the bushing receptacle.

Overall, the invention can also be described as follows:

A longitudinal link comprises two halves, namely an upper half and a lower half which, in the joined-together state, are connected to each other at a tubular pivot region (bushing receptacle). The tubular pivot region or the bushing receptacle bounds an opening for receiving a bearing bushing. There are different possibilities for connecting the two halves of the longitudinal link:

A preferred connection consists in that the tube for the bearing bushing (the bushing receptacle) is integrated in the upper cast part and the lower cast part is connected to a bottom region (lower region) of the tube. In an alternative configuration, the tube for receiving the bearing bushing (the bushing receptacle) is a separate part. The link elements or link halves are connected to the tube in an upper or a lower region. A further possibility consists in part or a half of the receiving tube for the bearing bushing being introduced or cast into the upper link element, and a second part or a second half into the lower link element. When the two link elements or link halves are connected to each other, the receiving tube or the tubular bushing receptacle is formed.

BRIEF DESCRIPTION OF THE DRAWINGS

The invention is described in more detail below with reference to preferred embodiments which are illustrated in the attached schematic drawings, in which.

DETAILED DESCRIPTION OF THE PREFERRED EMBODIMENTS

Elements which are identical or act in an identical manner are identified in all of the figures with the sane reference signs.

Figure 1:
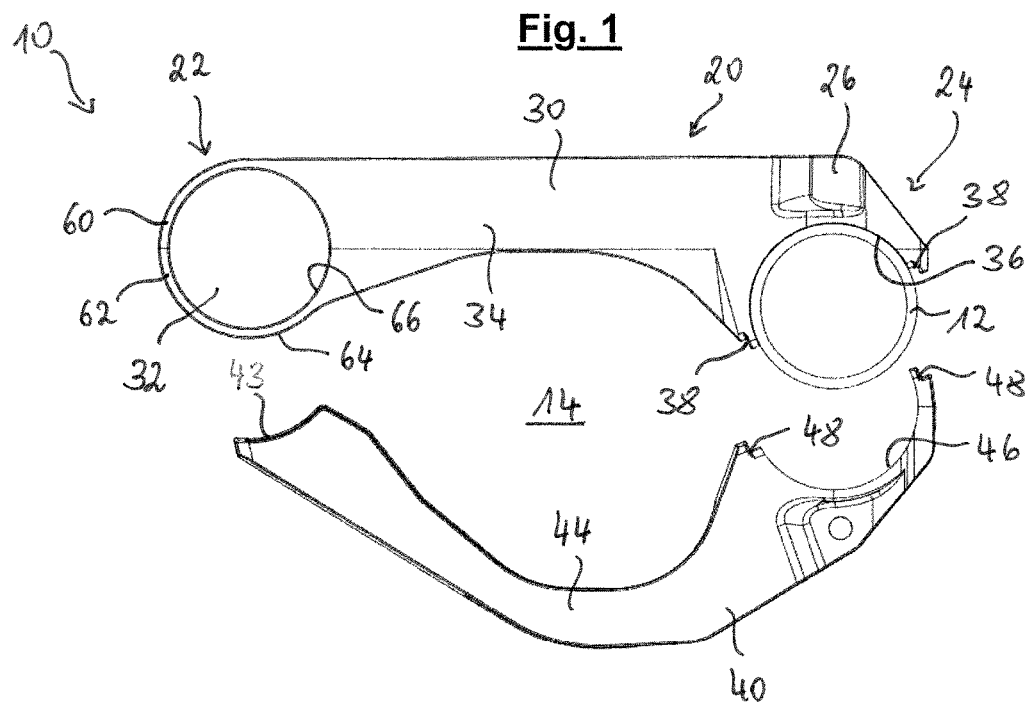
FIG. 1 shows a first embodiment of a link assembly according to the invention in a partially disassembled state.
Figure 2:
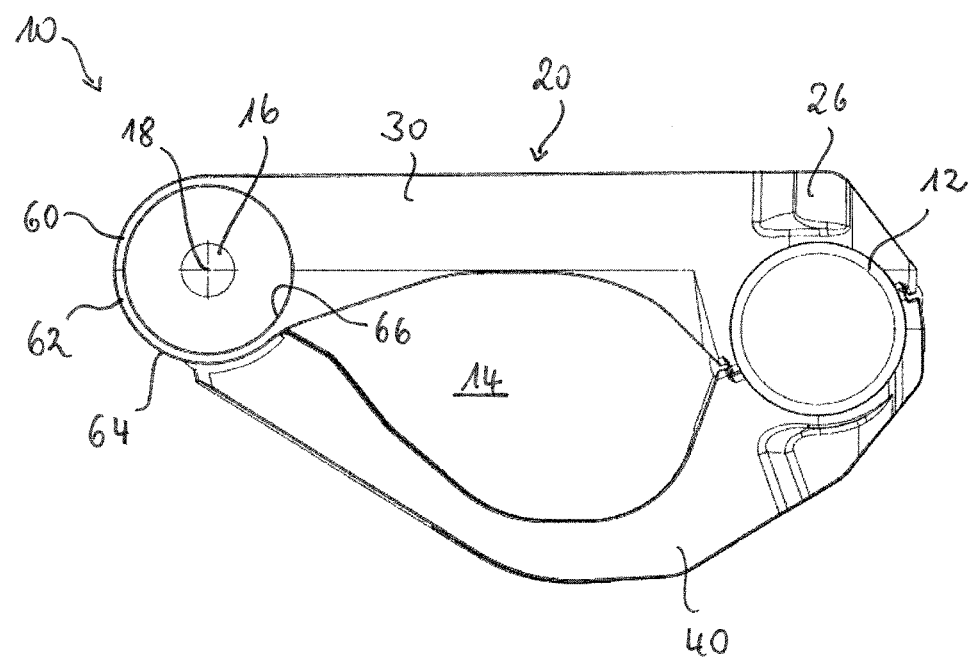
FIG. 2 shows the link assembly according to FIG. 1 in a mounted state.

FIGS. 1 and 2 show a first preferred embodiment of a link assembly 10 with a longitudinal link 20 which is formed by an upper link element 30 and a lower link element 40. The link elements 30, 40 can be formed as cast parts and are each of curved design.

A bushing receptacle 60 for receiving a bearing bushing (not illustrated) is formed at a first end 22 of the upper link element 30, said bushing receptacle bounding an opening 32 for the bearing bushing with a cylindrical cross section. The bushing receptacle 60 comprises a cylindrical wall 62 with a cylindrical outer surface 64 and a likewise cylindrical inner surface 66. Link webs 34 extend from the cylindrical outer surface 64 in the direction of a second end 24 of the link element 30 or longitudinal link 20. The link webs 34 and the cylindrical wall 62 are formed as an integral cast part or welded to each other. At the second end 24, the upper link element 30 has a recess 36 (cutout, indentation) for receiving a vehicle axle 12. The vehicle axle 12 is, for example, a cylindrical axle tube. The recess 36 correspondingly preferably has a circular-arc-shaped contour. Furthermore, a receptacle 26 for receiving a damping and/or spring element is formed at the second end 24 of the link assembly 10.

The lower link element 40 has an abutment surface 43 at its first end 22 for bearing against the cylindrical outer surface 64 of the bushing receptacle 60. The in particular circular-arc-shaped abutment surface 43 is adapted to the curvature of the outer surface 64. A recess 46 (cutout, indentation) for receiving the vehicle axle 12 is formed at the opposite second end 24. In the joined-together state of the link elements 30, 40, the recesses 36 and 46 form a circumferentially closed opening for the vehicle axle 12, preferably with a cylindrical cross section. Curved link webs 44 extend between the first end 22 and the second end 24.

For the connection of the upper link element 30 to the lower link element 40, connecting or joining regions 38 and 48 are respectively formed on the upper link element 30 and on the lower link element 40 in the region of the second end 24 along the vehicle axle 12. The link elements 30, 40 are in contact in the region of the connecting regions 38, 48 and are preferably connected to each other there in an integrally bonded manner. A second connection of the link elements 30, 40 takes place in the region of the first end 22 by means of a preferably integrally bonded connection of the abutment surface 43 to the outer surface 64 of the wall 62 of the bushing receptacle 60. The link elements 30, 40 can thereby be fixedly connected to each other at their opposite longitudinal ends, while a clearance 14 is formed in an inner region between the link elements 30, 40 without contact of the link elements 30, 40.

The bushing receptacle 60 serves for receiving a bearing bushing, preferably a plastic bushing or rubber bushing which can be designed, for example, as what is referred to as a 3D bushing (three-dimensional bushing). The bearing bushing can be designed, for example, according to U.S. Pat. No. 5,690,353, the disclosure of which is included to this extent by reference. The bearing bushing can be mounted on a bearing journal 16 which defines a pivot axis 18. The link assembly 10 or the longitudinal link 20 is thereby mounted rotatably about the pivot axis 18.

Figure 5:
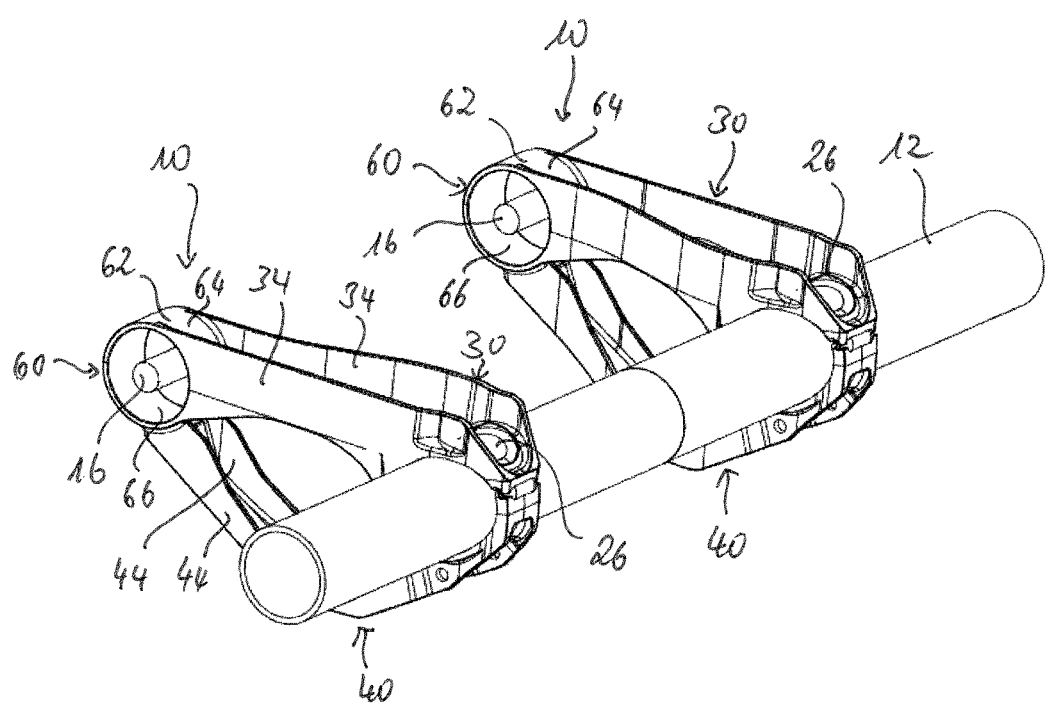
FIG. 5 shows an axle assembly with two link assemblies arranged on a vehicle axle.

FIG. 5 shows a perspective view of an axle unit with two link assembles 10 which are arranged opposite each other or next to each other and substantially correspond to the embodiment according to FIGS. 1 and 2. The respective upper link elements 30 face the vehicle, while the lower link elements 40 face the ground or face away from the vehicle.

Figure 3:
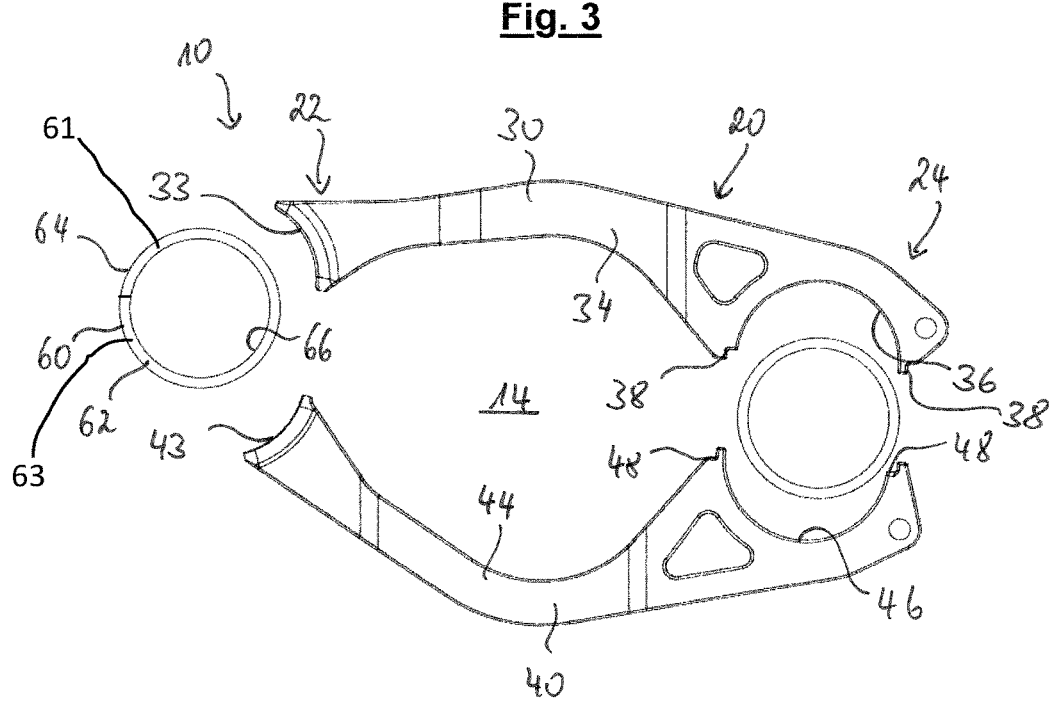
FIG. 3 shows a second embodiment of a link assembly according to the invention in a partially disassembled state.
Figure 4:
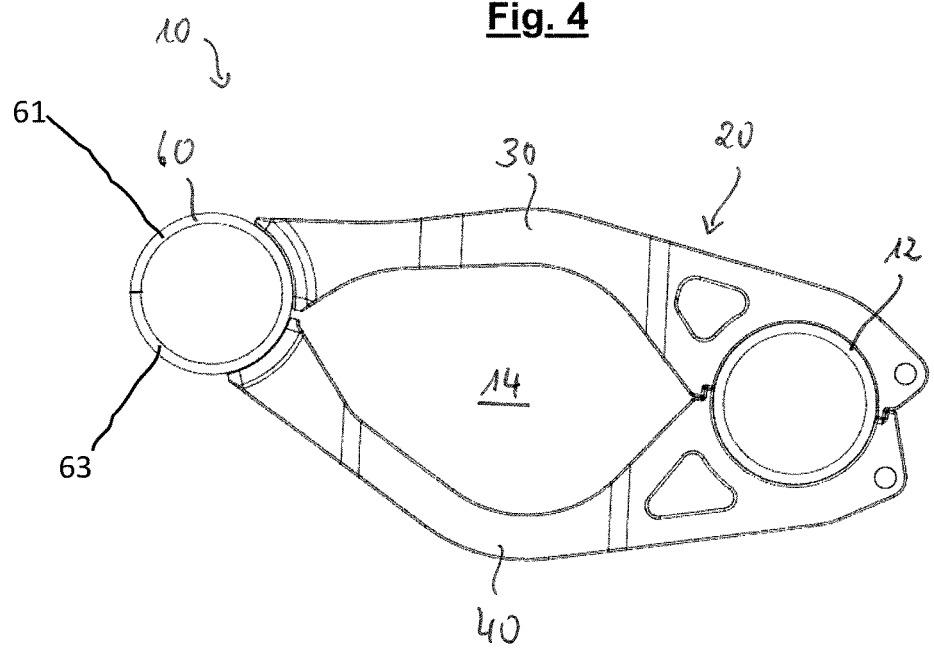
FIG. 4 shows the link assembly according to FIG. 3 in a mounted state.

FIGS. 3 and 4 show a further embodiment of a link assembly 10 according to the invention. In contrast to the embodiment according to FIGS. 1 and 2, the bushing receptacle 60 is designed as a separate part which can be secured in the region of the first end 22 both to the upper link element 30 and to the lower link element 40. The bushing receptacle 60 has a cylindrical wall 62 with a cylindrical outer surface 64 and a cylindrical inner surface 66, and may have a multi-part design that has an upper shell 61 and a lower shell 63. The upper link element 30 has a curved abutment surface 33 for bearing against the cylindrical outer surface 64 of the sleeve-shaped bushing receptacle 60. The abutment surface 33 extends as a curved plate with a circular-arc-shaped contour between two link webs 34 which run next to each other and extend in the direction of the second end 24.

The lower link element 40 is designed substantially analogously to the upper link element 30. The link element 40 has a curved abutment surface 43 for bearing against the cylindrical outer surface 64 of the sleeve-shaped bushing receptacle 60. The abutment surface 43 extends as a curved plate with a circular-arc-shaped contour between two link webs 44 which run next to each other and extend in the direction of the second end 24.

LIST OF REFERENCE SIGNS

10 Link assembly
12 Vehicle axle
14 Clearance
16 Bearing journal
18 Pivot axis
20 Longitudinal link
22 First end
24 Second end
26 Receptacle
30 Upper link element
32 Opening
33 Abutment surface
34 Link web
36 Recess
38 Connection region
40 Lower link element
43 Abutment surface
44 Link web
46 Recess
48 Connecting region
60 Bushing receptacle
62 Wall
64 Outer surface
66 Inner surface

The invention claimed is:

1. A link assembly for a vehicle, comprising:
a longitudinal link which has an upper link element and a lower link element; and
at least one bushing receptacle configured to receive a bearing bushing;
wherein the bushing receptacle is an integral, cast, single-piece with one of the link elements, and is connectable to the other link element.

2. The link assembly as claimed in claim 1, wherein the bushing receptacle is completely integrated in one of the link elements.

3. The link assembly as claimed in claim 2, wherein the bushing receptacle is integrated in the upper link element and, in the mounted state, is connected to the lower link element.

4. The link assembly as claimed in claim 3, wherein the bushing receptacle has a curved outer surface, and the lower link element has a correspondingly curved abutment surface for placing against the curved outer surface of the bushing receptacle.

5. The link assembly as claimed in claim 3, wherein the link elements surround an inner clearance in a curved manner and are connectable to each other in the region of the bushing receptacle via the bushing receptacle.

6. The link assembly as claimed in claim 2, wherein the bushing receptacle is integrated in the lower link element and is connectable to the upper link element.

7. The link assembly as claimed in claim 1, wherein the bushing receptacle is integrated in the upper link element and, in the mounted state, is connected to the lower link element.

8. The link assembly as claimed in claim 1, wherein the bushing receptacle has a curved outer surface, and the lower link element has a correspondingly curved abutment surface for placing against the curved outer surface of the bushing receptacle.

9. The link assembly as claimed in claim 1, wherein the link elements surround an inner clearance in a curved manner and are connectable to each other in the region of the bushing receptacle via the bushing receptacle.

10. The link assembly as claimed in claim 1, wherein the bushing receptacle is integrated in the lower link element and is connectable to the upper link element.

11. A link assembly for a vehicle, comprising:
a longitudinal link which has an upper link element and a lower link element; and
at least one bushing receptacle configured to receive a bearing bushing;
wherein the bushing receptacle is a single, cast, integral piece in at least one of the link elements; and wherein the bushing receptacle includes multiple parts and has an upper shell and a lower shell.

12. The link assembly as claimed in claim 11, wherein at least one of the upper shell of the bushing receptacle is integrated in the upper link element and the lower shell of the bushing receptacle is integrated in the lower link element.

13. The link assembly as claimed in claim 12, wherein the link elements surround an inner clearance in a curved manner and are connectable to each other in the region of the bushing receptacle via the bushing receptacle.

14. The link assembly as claimed in claim 11, wherein the link elements surround an inner clearance in a curved manner and are connectable to each other in the region of the bushing receptacle via the bushing receptacle.

15. A link assembly for a vehicle, comprising:
a longitudinal link which has an upper link element and a lower link element; and
at least one bushing receptacle configured to receive a bearing bushing;
wherein the at least one bushing receptacle is a monolithic, cast, single-piece with one of the link elements, and is connectable to the other link element.

\* \* \* \* \*